United States Patent [19]

Tazaki

[11] Patent Number: 4,542,384
[45] Date of Patent: Sep. 17, 1985

[54] ELECTRONIC EQUIPMENT WITH A PRINTER

[75] Inventor: Shigemitsu Tazaki, Matsudo, Japan

[73] Assignee: Canon Kabushiki Kaisha, Tokyo, Japan

[21] Appl. No.: 553,125

[22] Filed: Nov. 18, 1983

[30] Foreign Application Priority Data

Dec. 1, 1982 [JP] Japan .................................. 57-210904

[51] Int. Cl.[4] ........................ G01D 9/00; G01D 15/18
[52] U.S. Cl. .................................. 346/33 R; 346/136; 346/140 R; 364/518; 400/126
[58] Field of Search ................... 346/140 R, 139, 136, 346/33 R; 400/126; 364/518, 519

[56] References Cited

U.S. PATENT DOCUMENTS

| | | | |
|---|---|---|---|
| 2,944,651 | 7/1960 | Malcolm et al. | 400/583 |
| 4,074,067 | 2/1978 | Speckhard | 400/124 X |
| 4,180,704 | 12/1979 | Pettit | 250/237 G |
| 4,216,483 | 8/1980 | Kyser et al. | 346/140 R |
| 4,313,684 | 2/1982 | Tazaki | 346/140 X |
| 4,353,079 | 10/1982 | Kawanabe | 346/140 |
| 4,431,319 | 2/1984 | Karaki et al. | 400/124 |

*Primary Examiner*—Joseph W. Hartary
*Attorney, Agent, or Firm*—Fitzpatrick, Cella, Harper & Scinto

[57] ABSTRACT

Electronic equipment with a printer has a special graph print mode designation means, in which, when a special graph print mode is designated by the special graph print mode designation means in a graph data input operation, the print density of the corresponding graph data area in the graph is modified.

5 Claims, 7 Drawing Figures

ELECTRONIC EQUIPMENT WITH A PRINTER

BACKGROUND OF THE INVENTION

1. Field of the Invention

The present invention relates to graph printing in electronic equipment with a printer.

2. Description of the Prior Art

It has been a common practice to display a calculation result by a chart such as a graph to facilitate visual recognition. A desk-top computer or a portable printer having a graph print function has been known.

In the graph printing, data to be specially noted is preferably expressed with emphasis, and when respective items are to be expressed by different graph patterns, data to be specifically noted is preferably printed in an emphasized manner so that it is easily distinguished and hence efficiency of work is improved.

SUMMARY OF THE INVENTION

It is an object of the present invention to provide an electronic equipment with a printer in which a special key is provided, which when it is depressed, a print density of a graph pattern is increased in order to print the pattern in an emphasized manner.

BRIEF DESCRIPTION OF THE DRAWINGS

FIG. 3 illustrates a principle of printing, FIGS. 4A and 4B show memory contents.

DETAILED DESCRIPTION OF THE PREFERRED EMBODIMENTS

Figure 1:
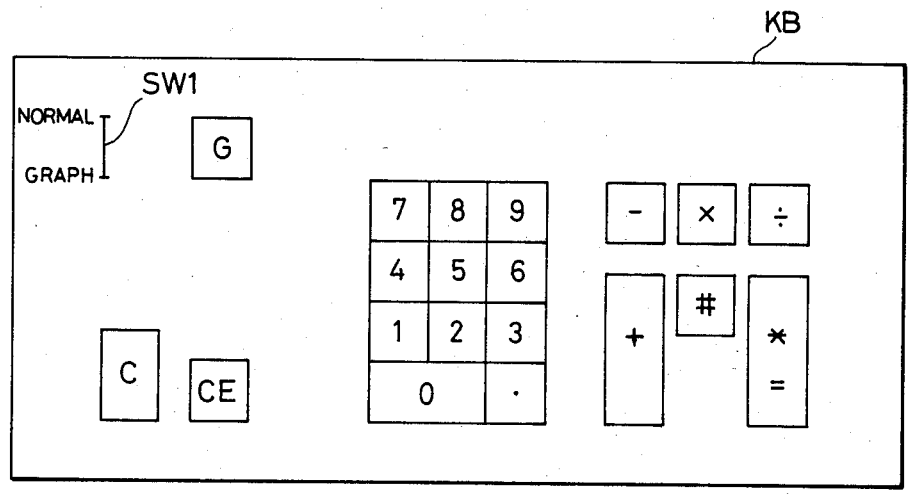
FIG. 1 is a front view of a keyboard of one embodiment of the present invention.
Figure 2:
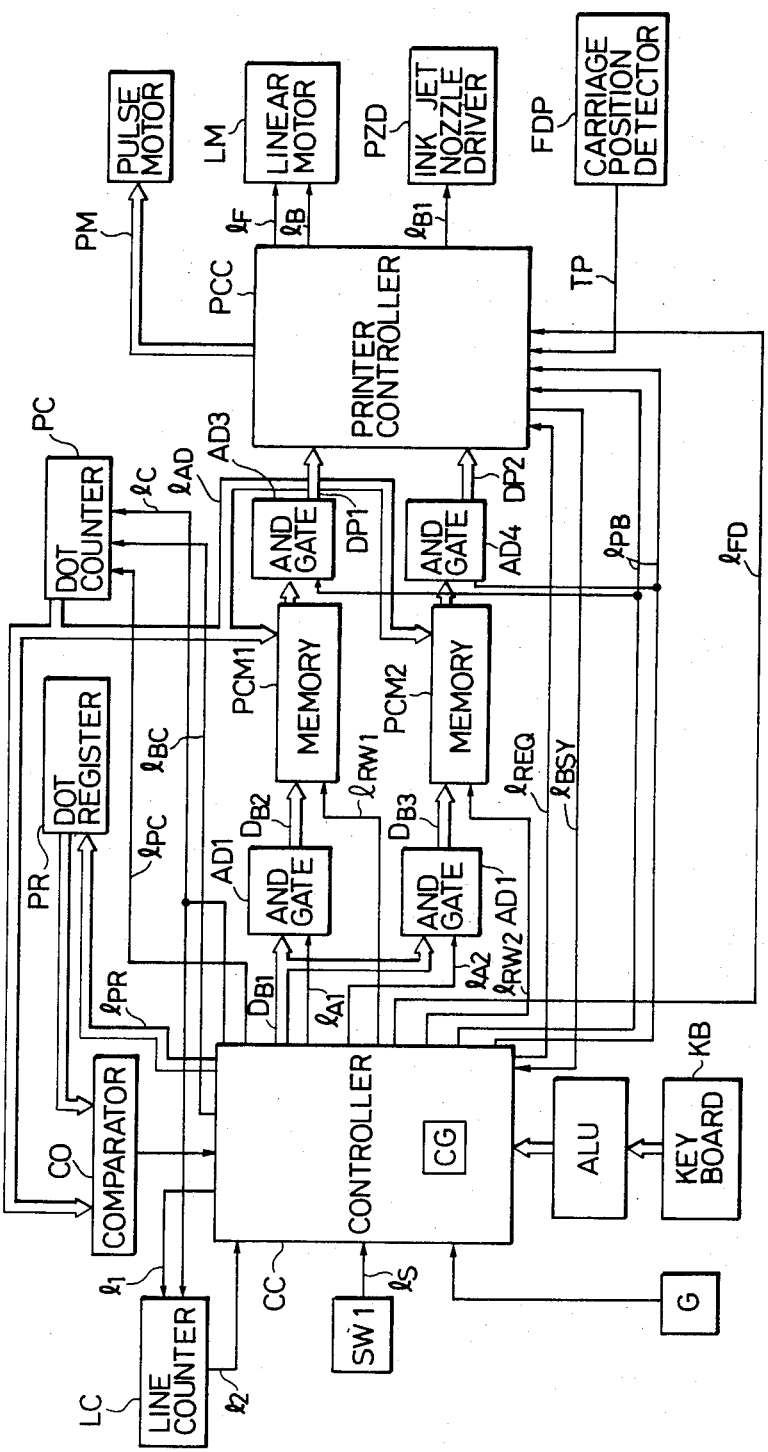
FIG. 2 is a control block diagram of the embodiment of the present invention.

FIG. 1 shows a diagram of a keyboard KB of a printer in accordance with one embodiment of the present invention. FIG. 2 shows a block diagram of a configuration for printing a graph while increasing a print density by data inputted by the keyboard KB.

In FIGS. 1 and 2, when a print mode switch SW1 on the keyboard KB is switched from a normal mode to a graph mode, a controller CC detects the graph print mode through a signal line $l_s$ and sets function keys on the keyboard KB to graph data input keys. A graph pattern consists of an aggregation of dots and one line consists of 126 dots horizontal and 7 dots vertical. Pattern memories PCM1 and PCM2 of FIG. 2 each have a 126-byte memory capacity with one byte including a 1×7-dot data. The memory PCM1 is used as a forward printing pattern memory and the memory PCM2 is used as a reverse printing pattern memory in order to effect forward/reverse printing so that the graph patterns are printed at an increased printing density.

Let us assume that a graph pattern has an area of 100% as a whole, and when "20 + 50 + = " is inputted, a graph of 70% area as a whole consisting of a 20% area and a 50% area is printed. If the 50% area data is to be printed in an emphasized manner, "50 + G = " is inputted so that the 50% area graph pattern is printed at an increased print density. That is, the key G is used as a special graph print mode designation means to print at the increased print density, and when this key is depressed in the graph pattern data input sequence, the print density for that data is increased.

The operation is now explained in detail with reference to FIG. 2.

When "20 + " and "50 + G = " are inputted, the controller CC detects the end of the graph data input when = is inputted and stores dot patterns representing the data 20% and 50% as well as dot patterns representing a space and a graph number, for example, 03 in the forward printing pattern memory PCM1 through a character generator CG in the controller CC. It also stores the dot pattern representing the data 50% and the dot pattern for the space in the reverse printing pattern memory PCM2 when G is inputted.

To store those dot patterns, "125" is set in a dot register PR through a signal line $l_{PR}$, and a dot counter PC and a line counter LC are cleared through a signal line $l_c$. An output line $l_{AD}$ of the dot counter PC is used as an address signal line to the pattern memories PCM1 and PCM2. A signal line $l_{A1}$ is set to "1" to open an AND gate AD1 so that the forward printing data on a data signal line DB1 appears on a data signal line DB2. A forward printing read/write signal line $l_{RW1}$ is set to "0" to write the pattern data into the forward printing pattern memory PCM1. The contents of the dot register PR and the dot counter PC are compared, and if they are not equal, the content of the dot counter PC is incremented by one through a signal line $l_{PC}$ to store the next 7-dot pattern data in the memory PC1. This operation is repeated until the contents of the counter PC and the register PR coincide to store the 126-byte graph data, that is, pattern data for 20%, 50%, space, graph number 03 and graph vertical axis line in the forward printing pattern memory PCM1.

To write the pattern data in the reverse printing pattern memory PCM2, the dot counter PC is cleared by the signal line $l_c$, and the signal line $l_{A1}$ is set to "0" to close the AND gate AD1 and the signal line $l_{A2}$ is set to "1" to open the AND gate AD2 so that the pattern data on the data signal line DB1 appears on the line DB3, and the special pattern data is stored in the reverse printing pattern memory PCM2 by setting the reverse printing read/write signal line $l_{RW2}$ to "0". The contents of the dot register PR and the dot counter PC are compared and if they are not equal, the content of the dot counter is incremented by one to write the next 1×7-dot reverse printing pattern data in the memory PCM2. This operation is repeated until the contents of the counter PC and the register PR coincide to write the 126-byte graph data, that is, the print data for the 50% and the space into the reverse printing pattern memory PCM2.

Figures 3, 4A, 4B:
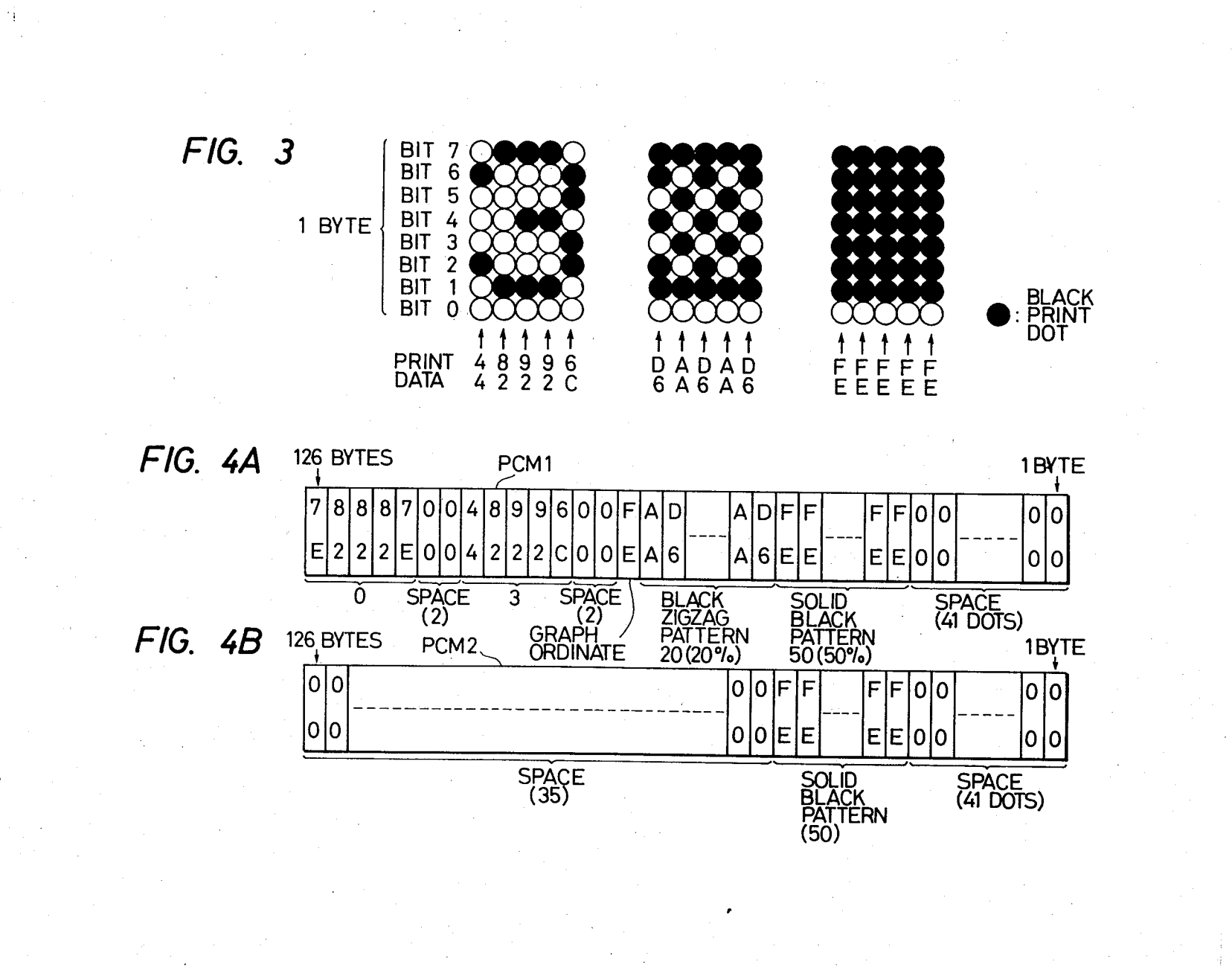

As described above, the data in the pattern memories PCM1 and PCM2 each consists of 1×7 dots stored in one-byte memory. They are dot pattern data converted by the character generator CG in the controller CC. Let us assume that the graph pattern for 20% is to be represented by a black zigzag pattern, the graph pattern for 50% is to be represented by a black solid pattern and a numeral "3" is to be printed as shown in FIG. 3. The lowermost dots of the patterns are assigned to the least significant bits, and the 1×7-dot patterns are represented by hexadecimal notation. The numeral is represented by 5×7-dot matrix and the graph pattern is represented by continuation of the 1×7-dot matrices. Thus, the numeral "3" is represented by the hexadecimal 6C, 92, 92, 82, 44 from the right toward the print line, the black zigzag pattern is represented by D6, AA, D6, AA, D6 and the black solid pattern is represented by FE, FE, FE, FE. The black solid circles represent the black dots.

In the graph print under consideration, the 20% area, the 50% area and the graph number 03 are to be printed and the black solid pattern for the 50% area is to be printed at the increased print density. The contents of the forward printing pattern memory PCM1 and the reverse printing pattern memory PCM2 are shown in FIG. 4. The dot pattern data are transferred to a printer controller PCC to print them. The printer feeds a paper by a pulse motor PM, has a piezo on-demand type ink jet nozzle for black ink mounted on the carriage, reciprocates the carriage by a linear motor LM and drives a piezo ink jet nozzle drive circuit PZD by a timing pulse TP detected by a carriage position sensor FDP to print out the pattern.

Figure 5:
FIGS. 5 and 6 show examples of printouts.

In the reciprocal print operation, the data from the forward printing pattern memory PCM1 are printed during the forward movmement of the carriage and the data from the reverse printing pattern memory PCM2 are printed during the reverse movement. The paper is fed by ½ dot pitch (½ dot pitch of the pattern dots of FIG. 3). Thus, after one reciprocation, the next print starts from the position shifted by one dot pitch from the previous forward print position. Thus, the graph pattern for the 50% area is printed as shown in FIG. 5, that is, printed at the increased print density. The operation is now explained with reference to FIG. 2.

When the dot patterns have been stored in the pattern memories PCM1 and PCM2, the controller CC sets the signal line $l_c$ to "0", clears the dot counter PC and the line counter LC and initializes the addresses of the pattern memories PCM1 and PCM2. It sets the forward and reverse printing read/write signal lines $l_{RW1}$ and $l_{RW2}$ to "1" (read state), and confirms that the busy signal line $l_{BSY}$ from the printer controller PCC is "1" 0 (non-busy) and sets the signal line $l_{PF}$ to "1" and the signal line $l_{PB}$ to "0" to instruct the print operation to the printer controller PCC. In response thereto, the printer controller PCC sets the busy signal line $l_{BSY}$ to "0" (busy), and sets the drive signal line $l_F$ for the linear motor LM to "1" and the signal line $l_B$ to "0" to move the carriage from the home position (right position as viewed to face the print paper) to the left (forward direction). It detects the timing pulse from the carriage position sensor FDP and sets the signal line $l_{BSY}$ to "1" at the timing pulse immediately preceding to the print start position to inform to the controller CC that the pattern data can be received. The controller CC sets the signal line $l_{REQ}$ to "0" to inform that the data on the data line DP1 through the AND gate AD3 which is now open by the signal line $l_{PF}$ to "1" is valid. (The AND gate AD4 is closed by the signal line $l_{PB}$ "0"). In response to the signal line $l_{REQ}$, the printer controller PCC reads in the data of the forward printing memory PCM1, sets the signal line $l_{BSY}$ to "0" (busy), and drives the piezo drive circuit PZD by the signal line $l_{B1}$ at the next timing pulse to print the black dots corresponding to the higher order bits (first line in FIG. 5) of the 1×7-dot pattern. Since the first byte data is 00 (see FIG. 4), the first print is space. After the printing, the signal line $l_{BYS}$ is set to "1" to inform to the controller CC that the next pattern data can be received. The controller CC increments the dot counter PC by one by the signal line $l_{PC}$ to increment the address to the pattern memories by one to transfer the next data to the data line DP1 through the AND gate AD3, and sets the signal line $l_{REQ}$ to "1" to inform that the data on the data line DP1 is valid. The printer controller PCC reads in the data of the pattern memory PCM1 and prints it out at the next timing pulse. In a similar manner, the data shown in FIG. 4(A) are sequentially printed in the direction of the arrow to forward-print the data of the highest order bits in the first line of the 1×7-dot forward printing pattern data. The content of the dot counter which is incremented by one for each print and the content of the dot register PR are compared by the comparator CO, and when they coincide, the controller CC determines the end of the 126-dot printing, sets the dot register PR to "0" by the signal line $l_{PR}$, sets the signal line $l_{PF}$ to "0" and sets the signal line $l_{BF}$ to "1".

The printer controller PCC sets the busy signal line $l_{BSY}$ to "0", sets the motor signal line $l_f$ to "0" and sets the signal line $l_B$ to "1" to drive the carriage reversely to start the reverse printing. Since the signal line $l_{PF}$ is "0" and the signal line $l_{PB}$ is "1", the AND gate AD3 is closed and the AND gate AD4 is open. Thus, the data of the reverse printing pattern memory PCM2 appears on the data signal line DP2. The paper feed pulse motor PM is driven to feed the paper by ½ dot pitch. Like the forward printing, the busy signal line $l_{BSY}$ is set to "1" at the timing pulse immediately preceding to the print position to inform to the controller CC that the pattern data can be received. The controller CC sets the signal line $l_{REQ}$ to "0" to inform that the first data or the 126th dot data for the reverse printing is valid. The printer controller PCC receives the data from the reverse printing pattern memory PCM2 through the data signal line DP2 and prints it out at the next timing pulse and sets the busy signal line $l_{BSY}$ to "1" to inform that the next reverse printing pattern data can be received. Because it is the reverse printing, the controller CC decrements the dot counter PC by one by the signal line $l_{BC}$ and decrements the pattern memory address by one to supply the 125th byte data to the data line DP2 through the AND gate AD4 which is opened by the signal line $l_{PB}$, and sets the signal line $l_{REQ}$ to "0" to print data at the next timing pulse. In a similar manner, the dot pattern data of the first line of the 1×7-dot reverse printing pattern data is reversed-printed until the first byte data is printed. The number of print dots is compared by the comparator CO and the controller CC increments the line counter LC by one by the signal line $l_1$. The output signal line $l_c$ of the line counter LC is used to check if seven reciprocal runs of the carriage have been completed. Since it is now the first reciprocal run, no output is produced on the signal line $l_2$. Thus, the content of the dot register RP is set to "125", the signal line $l_{PF}$ is set to "1" and the signal line $l_{PB}$ is set to "0" to command the printing of the second line of 1×7 dots. The printer controller PCC sets the busy signal line $l_{BSY}$ to "0" and feed the paper by ½ dot pitch by the paper feed pulse motor PM (one dot pitch from the forward printing of the first line), sets the drive signal line $l_F$ of the linear motor LM to "1" and sets the signal line $l_B$ to "0" to effect the forward printing. When the comparator CO detects the coincidence, the paper is fed by ½ dot pitch and the reverse printing is effected. In a similar manner, seven reciprocal runs are carried out. After the seven reciprocal runs of printing, the controller CC receives the output from the line counter LC by the signal line $l_2$ to detect the end of the 1×7-dot printing for the lateral 126 dots.

Figure 6:
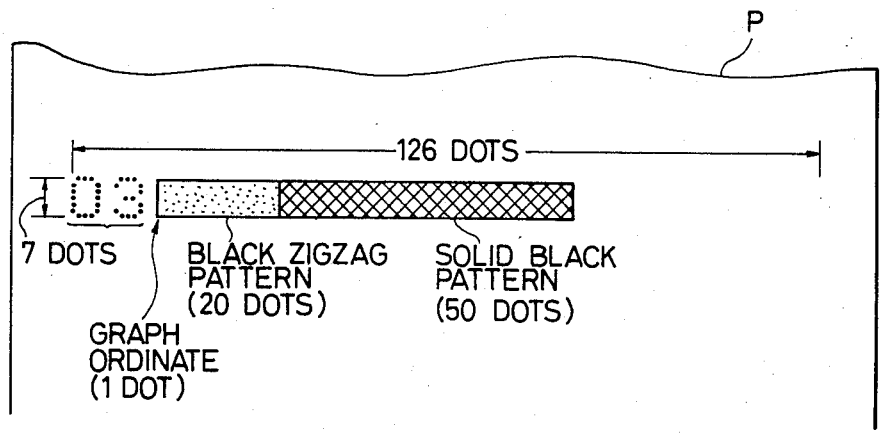

In the print operation, the black zigzag pattern for the 20% area, the black solid pattern for the 50% area, the vertical axis of the graph and the graph number "03"

are printed in the forward printing, and only the black solid pattern for the 50% area except the space area is printed in the reverse printing with the paper being shifted by ½ dot pitch. As a result, the black solid pattern for the 50% area is printed at the increased print density as shown in FIG. 5. The printout is shown in FIG. 6.

As described hereinabove, according to the present invention, the data to be particularly noted in the graph pattern is printed at the increased print density by depressing the special graph print mode designation key G so that area corresponding to that data is emphasized and work efficiency is improved.

While only one color is used in the present embodiment, multi-color printing may be carried out with multi-color pattern memories and multi-color nozzles. Further, while the print density of one of the data of the graph is emphasized in the present embodiment, the graph may be formed by one data and the print density for that data may be increased.

While the print density of the specific data is increased in the present embodiment, the pattern for the specific data may be printed only in the forward printing and other data areas may be printed in both forward and backward printings so that the specific data area is instead printed at a decreased print density.

I claim:

1. Electronic equipment having a printer, comprising:
   numeric keys for providing graph data;
   key means for manually selecting one of a first print mode in which the graph data is printed at a first print density and a second print mode in which the graph data is printed at a second print density higher than the first print density; and
   print means including a dot print element for reciprocating along a line relative to a recording medium to print dots thereon, wherein said dot print element prints when moving in one direction when the first print mode is selected and prints when moving in both directions when the second mode is selected, so as approximately to double the number of dots used to print the graph data in the second print mode.

2. Electronic equipment according to claim 1; further comprising:
   means for selectively feeding the recording medium in a direction substantially perpendicular to the line of reciprocation of said dot print element at one of first and second pitches, the second pitch being shorter than the first pitch; and
   means for feeding the recording medium at the first pitch when the first print mode is selected and at the second pitch when the second print mode is selected.

3. Electronic equipment according to claim 1; wherein said print means includes an ink jet nozzle driver for forming dots of a substantially constant size in both print modes.

4. Electronic equipment having a printer, comprising:
   numeric keys for providing graph data;
   key means for manually selecting one of a first print mode in which the graph data is printed at a first print density and a second print mode in which the graph data is printed at a second print density higher than the first print density;
   print means including a dot print element for reciprocating along a line relative to a recording medium to print dots thereon;
   means for selectively feeding the recording medium in a direction substantially perpendicular to the line of reciprocation of said dot print element at a pitch selected from one of a reference pitch and a second pitch substantially equal to one-half of the reference pitch, the reference pitch being substantially equal to the dot size; and
   means for controlling said print means so that said dot print element prints when moving in one direction and the recording medium is fed at the reference pitch when the first print mode is selected and so that said dot print element prints when moving in both directions and the recording medium is fed at the second pitch when the second print mode is selected.

5. Electronic equipment according to claim 5; wherein said print means includes an ink jet nozzle driver for forming dots of a substantially constant size in both print modes.

* * * * *

UNITED STATES PATENT AND TRADEMARK OFFICE
CERTIFICATE OF CORRECTION

PATENT NO. : 4,542,384

DATED : September 17, 1985

INVENTOR(S) : SHIGEMITSU TAZAKI

It is certified that error appears in the above-identified patent and that said Letters Patent is hereby corrected as shown below:

Column 1, line 59, change ""20 + 50 + ="" to --"20 $\boxed{+}$ 50 $\boxed{+}$ $\boxed{\genfrac{}{}{0pt}{}{*}{=}}$ "--;

lines 62 and 63, change ""50 + G ="" to --"50 $\boxed{+}$ G $\boxed{\genfrac{}{}{0pt}{}{*}{=}}$ " --; and line 65, change "G" to --$\boxed{G}$--.

Column 2, line 3, change ""20 +" and "50 + G="" to --"20 $\boxed{+}$ " and "50 $\boxed{+}$$\boxed{G}$$\boxed{\genfrac{}{}{0pt}{}{*}{=}}$ "--;

line 5, change "=" to --$\boxed{\genfrac{}{}{0pt}{}{*}{=}}$--; and line 12, change "G" to --$\boxed{G}$--.

Column 3, line 68, change ""1"" to --"0"--.

Column 4, line 15, before "motor" insert --linear--; and line 50, change "RP" to --PR--.

Column 5, line 12, change "G" to --$\boxed{G}$--.

Signed and Sealed this

Twenty-sixth Day of August 1986

[SEAL]

Attest:

DONALD J. QUIGG

Attesting Officer

Commissioner of Patents and Trademarks